United States Patent [19]

Johnson et al.

[11] 4,309,773

[45] Jan. 5, 1982

[54] APPARATUS AND METHOD FOR RADIO CHANNEL SELECTION

[75] Inventors: George B. Johnson, La Jolla; Gerald A. Clapp, San Diego, both of Calif.

[73] Assignee: The United States of America as represented by the Secretary of the Navy, Washington, D.C.

[21] Appl. No.: 141,703

[22] Filed: Apr. 18, 1980

[51] Int. Cl.³ .................... H04B 15/00; H04B 17/00
[52] U.S. Cl. ........................................ 455/62; 455/67
[58] Field of Search ................ 455/49, 51, 52, 62, 455/67, 77, 32

[56] References Cited

U.S. PATENT DOCUMENTS

| | | | |
|---|---|---|---|
| 3,160,813 | 12/1964 | Biggi et al. | 455/62 |
| 3,443,228 | 5/1969 | Brenner et al. | 455/62 |
| 4,146,839 | 3/1979 | Troy | 455/62 |
| 4,197,500 | 4/1980 | Klein et al. | 455/62 |

Primary Examiner—Jin F. Ng

Attorney, Agent, or Firm—R. S. Sciascia; Ervin F. Johnston; T. A. Meador

[57] ABSTRACT

An improved apparatus and method for selecting a carrier frequency channel between two radios are disclosed wherein one radio transmits a cyclic test signal sequentially on a set of frequencies for a period of time at each frequency sufficient to allow a second radio fo sweep through the entire set while pausing at each frequency for a period of time sufficient to receive a cycle of the test signal. The second radio utilizes the detected test signal to evaluate the transmission quality of the carrier frequency channel upon which it is received. After the second radio recognizes the test signal on a carrier frequency for a second time, it ceases evaluation and transmits an answer signal upon the carrier frequency with the highest transmission quality. The first radio is enabled to detect the answer signal by initiating reception at the end of each test signal transmission and sweeping through the entire set of frequencies at the rate of sweep of the second radio.

15 Claims, 10 Drawing Figures

APPARATUS AND METHOD FOR RADIO CHANNEL SELECTION

STATEMENT OF GOVERNMENT INTEREST

The invention described may be manufactured and used by or for the Government of the United States of America for governmental purposes without the payment of any royalties thereon or therefor.

BACKGROUND OF THE INVENTION

The present invention is related to a radio communication system and more particularly is related to a radio communication system capable of automatically evaluating carrier frequencies for transmission quality and selecting the frequency with the highest quality for operation.

Broadcast communication involving mobile radios is more difficult than fixed radio communication. Along with the normal broadcast communication problems of propagation and interference, the mobile radio has the additional problems of low power limitation, antenna coupling losses, poor antenna patterns, and changing antenna losses and patterns. Full time mobile radio communication requires the availability of several carrier frequency channels spread across the broadcast spectrum of interest to accommodate short-term changes in ionospheric sky-wave propagation. Fixed radio communication circuits can take advantage of multiple frequency assignments and switch to frequencies which are propagating well and have low interference. A method of frequency selection is taught in U.S. Pat. No. 3,617,891, issued to D. H. Covill, entitled OPTIMUM FREQUENCY DETERMINING RADIO COMMUNICATION SYSTEM, filed May 26, 1969.

The Covill patent discloses a structured frequency selection method suitable for fixed radio circuits. The method comprises a synchronous search mode which is entered first and an asynchronous search mode, entered only upon the failure to qualify a frequency channel during the synchronous search. The asynchronous search mode entails transmission of a test signal by a first radio on each frequency in a set of frequencies taken at a slow rate. The receiver of a second radio is tuned at a higher rate to each in the set of frequencies for detection of the test signal on the frequency of transmission. The asynchronous mode requires a degree of synchronism in that the second radio, upon detecting the test signal, must immediately retransmit it at the same frequency. The first radio must then detect the test signal, evaluate the signal-to-noise ratio at the carrier frequency, and transmit an answer signal to the second radio if the transmission quality of the frequency channel is acceptable. This method does not qualify every available carrier frequency channel in the set of assigned frequencies because it is interrupted when the first channel is qualified. Hence, the freqency channel with the highest transmission quality is not necessarily selected. Furthermore, the multiplicity of transmissions required limits the reliability of the method and extends the time required to evaluate the whole set of frequencies.

Operators of battery operated mobile radios on the move in the field presently require a rapid, reliable means of determining the optimum frequency for use at a given time over a given path. An asynchronous selection method is preferred because the time required for antenna tuning before transmission is uncontrolled; it varies according to the constantly changing location of a mobile radio. The method must involve as few transmissions as possible in order to preserve battery power. Minimization of transmission is also important when the security of the circuit is at stake. Finally, a method is desired which will evaluate all available carrier frequencies for the purpose of selecting the best among them.

SUMMARY OF THE INVENTION

The present invention provides an improved apparatus and method for selecting an optimum radio carrier frequency for transmission between two radios. The unimproved apparatus is of the type where a test signal is transmitted from a first radio for a period of time on each of a set of carrier frequencies taken sequentially at one rate and a second radio is tuned to each in the set of carrier frequencies at a higher rate to search for the test signal. In the unimproved apparatus, the second radio detects the test signal asynchronously on a succession of carrier frequencies and retransmits the test signal after each detection to the first radio for evaluation of the transmission quality of the carrier frequency upon which the test signal has been received. The present invention provides an improvement to this apparatus by providing means to switch the first radio at the end of test signal transmission on a carrier frequency to a receiving mode and to sequentially tune the first radio at the higher rate to each frequency in the set to search for an answer signal from the second radio. Means are provided at the first radio to generate a characteristic test signal for transmission at each carrier frequency. At the second radio, when the test signal is received on a carrier frequency, the signal-to-noise ratio at that carrier frequency is computed by an evaluation means according to a method of the invention. After the second radio receives the test signal upon a carrier frequency for the second time, answer signal means tune it to the carrier frequency upon which the highest signal-to-noise ratio has been detected for transmitting an answer signal thereon. This improvement results in asynchronous evaluation of all available carrier frequency channels and selection of the channel having the highest signal-to-noise ratio.

OBJECTS OF THE INVENTION

An object of the present invention is to provide improvements in asynchronous radio channel selection apparatuses and methods.

Another object is to provide an improved asynchronous radio channel selection apparatus by which all available carrier frequencies can be evaluated.

Yet another object is to provide an improved asynchronous radio channel selection apparatus which reduces the number of transmissions required to select a channel, thereby reducing total power required to accomplish the selection and preserving the security of the circuit.

A further object is to provide an apparatus and method for evaluating the signal-to-noise ratio of a carrier frequency radio channel.

A still further object is to provide an improved asynchronous radio channel selection apparatus which ensures selection of the channel with the highest signal-to-noise ratio of a set of available channels.

These and other objects of the invention will become more readily apparent from the ensuing description when taken together with the drawings.

DESCRIPTION OF THE PREFERRED EMBODIMENT

Figure 1:
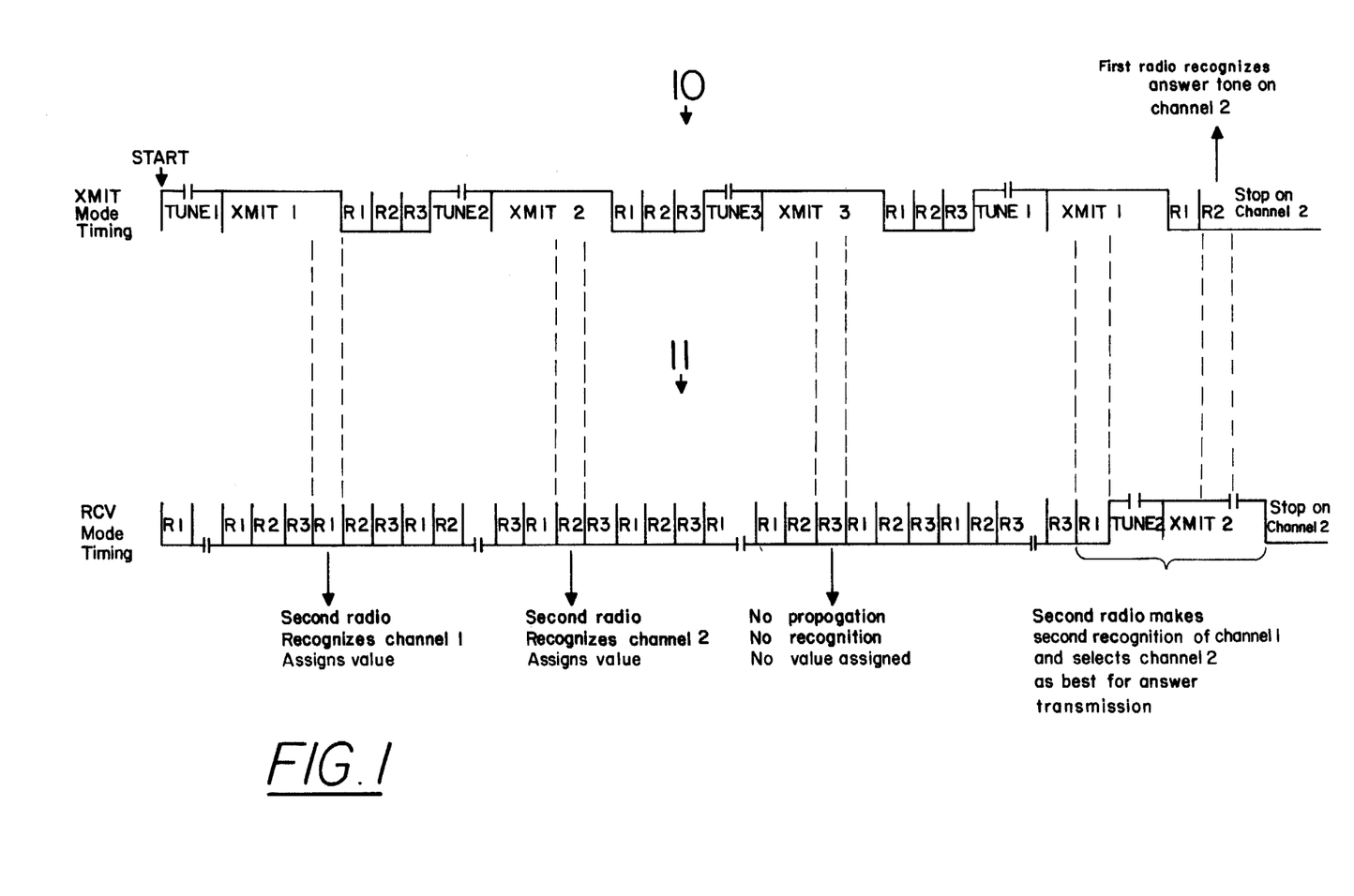
FIG. 1 is a timing diagram of the method of the invention.

Referring now to FIG. 1, there is illustrated a timing diagram for an improved method of radio carrier frequency channel selection. A set of candidate carrier frequency channels, three for example, can be established from which to select one for transmission between two radios. Under control of a channel selection apparatus, described in greater detail hereinbelow, a first radio can be caused to transmit a test signal on each frequency taken at a predetermined rate. For test signal transmission, the first radio operates in the transmit mode (XMIT), shown in timing diagram 10, during which it tunes to the first frequency in the set, channel 1 for example, and transmits a test signal, described in greater detail hereinbelow, for a period of time long enough to permit a second radio to receive for a period of time, for example 0.65 seconds, on each of the candidate channels during the transmission. This is shown in timing diagram 10 as TUNE1/XMIT1. After the first radio transmits the test signal on channel 1 for a period based upon the number of carrier frequencies in the set, it receives for a period of time, for example 0.65 seconds, on each of the candidate channels in a search for an answer signal. After the search, shown as R1/R2/R3 in timing diagram 10, the channel selector then tunes the first radio for transmission of the test signal on the next candidate channel. This is shown as TUNE 2/XMIT 2 in timing diagram 10. The first radio repeats the transmit sequence until it recognizes an answer transmission from the second radio. Upon recognition of the answer transmission, the channel selection apparatus stops the transmit sequence while tuned to the recognized channel and switches the first radio to normal operation, permitting an operator to communicate.

As shown in timing diagram 11 of FIG. 1, the second radio, also under control of a channel selection apparatus, in a receive (RCV) mode enters a continuous tuning sequence to receive for a period of time, for example 0.65 seconds, on each of the candidate channels. When the first radio transmits on a channel to which the second station is tuned, assuming the channel propagates, the channel selection apparatus will recognize the transmission and assign a value to the quality of the received signal according to a method described in greater detail hereinbelow and to the frequency channel upon which it was propagated.

Thus, in timing diagram 11, the second radio channel selection apparatus recognizes channel 1 and assigns a value to it. Channel 2 is also recognized and qualified. Channel 3 does not propagate, no recognition occurs and no value is assigned.

When the selection apparatus in the second radio recognizes channel 1 for the second time, it tunes the radio to the channel having the highest observed signal quality, channel 2 in this case, and transmits an answer signal on the selected channel. This is shown as the TUNE 2/XMIT 2 sequence at the end of timing diagram 11. This answer signal is transmitted for a period of time, 18 seconds for example, to ensure that the first radio will be tuned to and receiving on the selected channel at some time during the answer transmission. After the channel selection apparatus in the second radio ends the answer transmission, it stops the selection process and switches the radio to voice operation.

Figure 2:
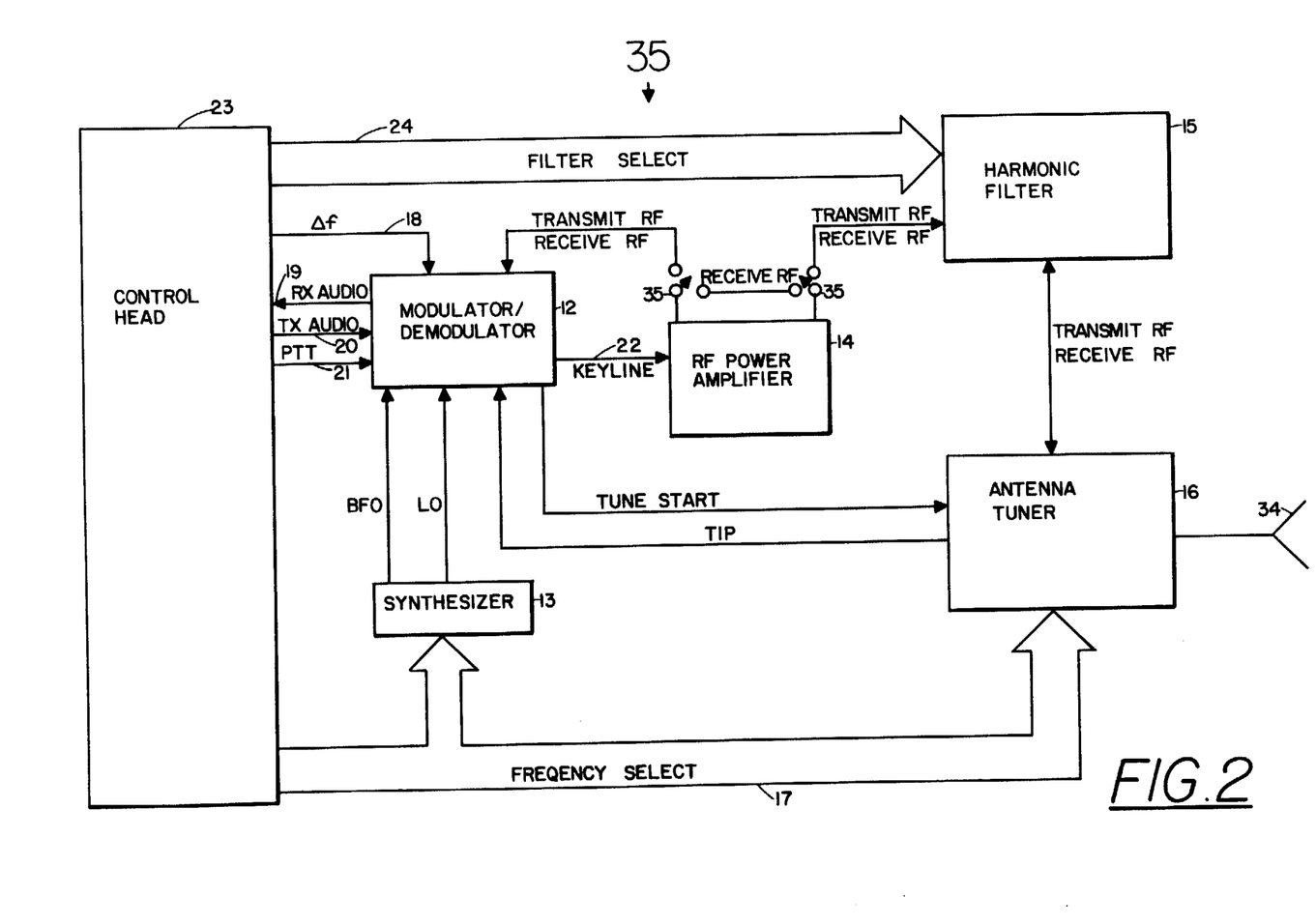
FIG. 2 is a block diagram of a digitally controlled radio.

The portable AN/PRC-104 radio set illustrated in FIG. 2 provides high frequency, two way communication between military personnel in a field environment. It is representive of the type of radio to which the method of the invention may be applied. The AN/PRC-104, represented in FIG. 2 as radio 35, comprises six major subassemblies. The control head 23 allows the operator to control radio 35 by providing channel selection, audio signal coupling, and mode selection. A modulator/demodulator 12 performs modulation and frequency conversion of audio signals during transmission to produce a transmit RF signal; during reception it performs frequency conversion, filtering and audio detection. Digitally controlled synthesizer 13 develops local oscillator (LO) signals and a beat frequency oscillator (BFO) signal used for conversion and detection. RF power amplifier 14 amplifies the transmit RF signal during transmission. A digitally controlled harmonic filter 15 removes spurious received signals and suppresses transmitter harmonics. A digitally controlled antenna tuner 16 automatically matches antenna impedance to the radio set.

During transmission, a voice signal from a handheld microphone, not shown, is routed through control head 23 to the modulator/demodulator 12 along signal path 20. Modulator/demodulator 12 utilizing the BFO and LO signals mixes the audio to produce a 2 to 30 MHz transmit RF signal. The specific frequency of transmit RF signal is determined by the LO signals developed in synthesizer 13. Production of the LO signals in synthesizer 13 is controlled by binary coded decimal (BCD) signals on signal bus 17. Manually controlled channel selection switches, not shown, on control head 23, connected to signal bus 17, produce the BCD.

The transmit RF output from the modulator/demodulator is routed to RF power amplifier 14, which utilizes transmission gain control (TGC) to equalize the power level of all transmitted signals, and then through harmonic filter 15 to suppress transmitter harmonics. Binary coded channel select signals from the channel selection switches on control head 23 are transmitted along signal bus 24 to harmonic filter 15. These signals energize specific filter select relays and connect the proper filter for the operating frequency period. The transmit RF output is routed from filter 15 through antenna tuner 16 to antenna 34. Antenna tuner 16 responds to the BCD signals on bus 17 to automatically transform actual antenna impedance to a preset value, presenting a constant load to the radio set.

The received RF signal follows the same path, in reverse, as the transmit RF with the exception that amplifier 14 is bypassed when switch 35 is activated by a signal on keyline 22. Spurious received signals are removed by harmonic filter 15 and the signal is applied directly to modulator/demodulator 12. The receive RF is then converted to audio in modulator/demodulator 12, which includes an amplifier utilizing automatic gain control (AGC) to equalize the power level of all received signals, and routed to the microphone along signal path 19 through control head 23.

During operation of radio 35 with a handheld microphone, a press to talk (PTT) switch on the handset is depressed during transmission causing a grounding signal to be transmitted through control head 23 on signal path 21 to modulator/demodulator 12 to control keyline 22. When the carrier frequency channel is changed for transmission, a pulse (Δf) is transmitted on signal path 18 to modulator/demodulator 12 where a tune-start command is generated to initiate a tune cycle at antenna tuner 16. During an antenna tuning cycle, tuner 16 develops a tune in progress (TIP) signal. Modulator/demodulator 12 outputs an audio tone on path 19 whenever the TIP signal is present. If local conditions do not permit tuning antenna 34 to the desired transmission frequency, modulator/demodulator 12 produces a beeping tone on path 19 when the TIP signal ends.

Figure 3:
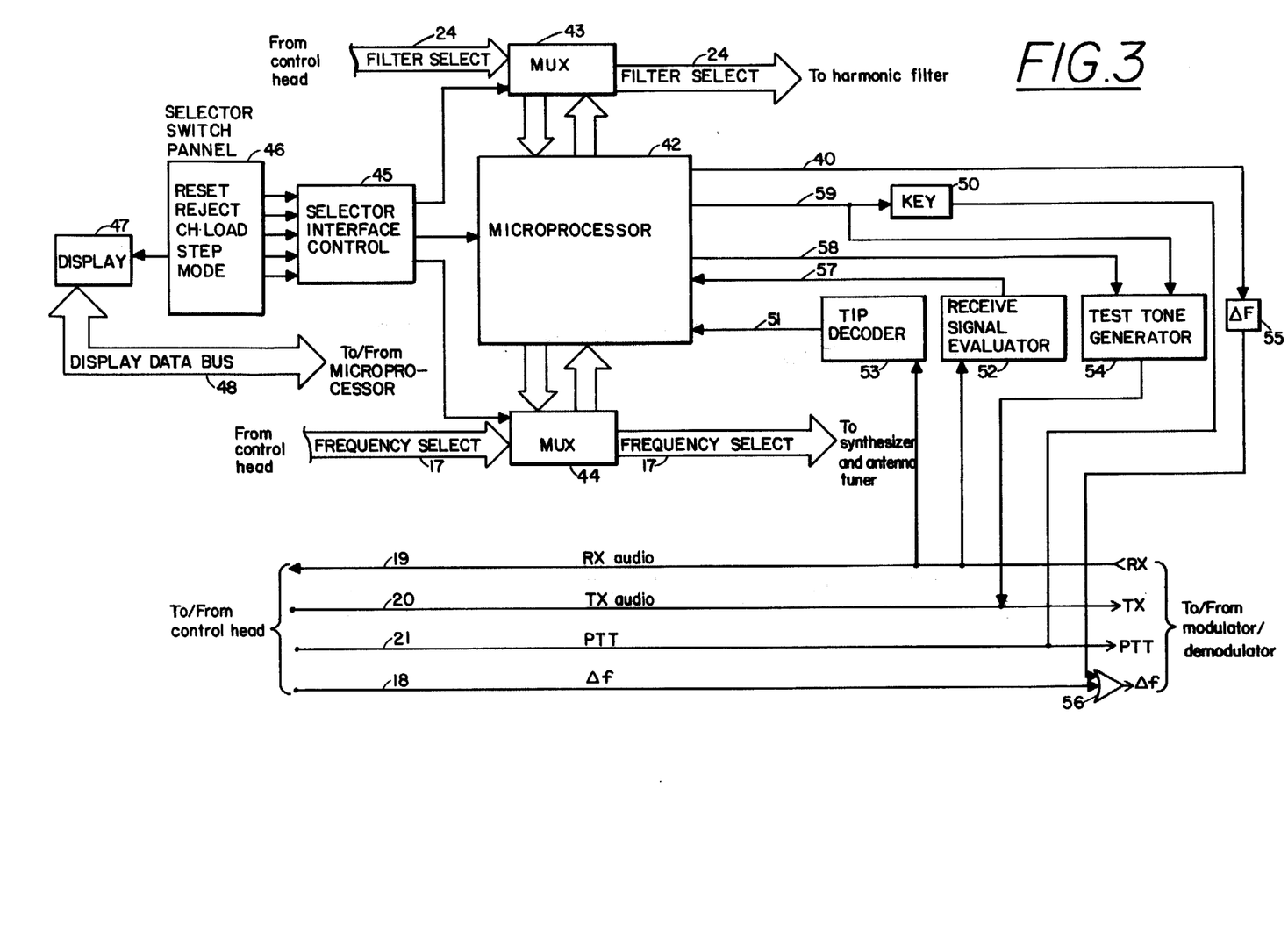
FIG. 3 is a block diagram of an embodiment of the invention.

Referring now to FIG. 2 and FIG. 3, wherein like reference numerals designate like or similar elements throughout the two views, there is illustrated in FIG. 3 a channel selector apparatus which operates according to the invention to control radio 35. The channel selector illustrated in FIG. 3 comprises microprocessor 42 controlled by selector control panel 46 and selector interface control 45. Digitally controlled display 47 provides control information relevant to the operation of the illustrated selector to an operator. Display panel 47 can comprise a digitally controlled liquid crystal display operated by binary coded decimal data interchanged with microprocessor 42 on display data bus 48.

Multiplexer 43, connected to and under the control of switch panel 46, allows filter select data to be fed to harmonic filter 15 from either control head 23 or microprocessor 42 on signal bus 24. Multiplexer 44, also connected to and under the control of selector switch panel 46, allows channel frequency data to be fed to synthesizer 13 and antenna tuner 16 from either control head 23 or microprocessor 42 on signal bus 17.

When radio 35 is under the control of the channel selector illustrated in FIG. 3, the following circuits controlled by microprocessor 42 are activated: key circuit 50, TIP detector 53, receive signal evaluator 52, test tone generator 54, and Δf circuit 55.

The Δf circuit 55, which can comprise a one-shot multivibrator, is connected to modulator/demodulator 12 through OR gate 56, spliced into signal path 18. OR gate 56 also has an another input the Δf signal supplied by control head 23 during normal operation of radio 35. Signal path 40 provides connection between an output of microprocessor 42 and the input of Δf circuit 55.

Key circuit 50, which can comprise a gated transistor with its collector connected to signal path 21, its emitter to ground, and its base to microprocessor 42 on signal path 59, provides the push to talk signal to modulator/demodulator 12 when radio 35 is transmitting under the control of the channel selector. Tune in progress tone decoder 53 is connected between audio receive input line 19 and an input of microprocessor 42 on signal path 51. Also connected between receive audio signal path 19 and an input of microprocessor 42 on signal path 57 is receive signal evaluator 52 described in more detail hereinbelow. Test tone generator 54, also described hereinbelow, is connected to microprocessor 42 on signal paths 59 and 58 and to transmit audio signal path 20.

The operation of the channel selector illustrated in FIG. 3 comprises three modes, LOAD, XMIT, and RCV, selected by operation of an appropriate mode select switch, not shown, on switch panel 46.

In the LOAD mode radio 35 is controlled entirely from control head 23 and the selector becomes functionally transparent to radio 35. The LOAD mode is used to enter the set of carrier frequencies in BCD into microprocessor 42 and to reject loaded carrier frequencies to which antenna tuner 16 cannot tune. A carrier frequency loading sequence may, for example, be commenced when an appropriate reset switch, not shown, on switch panel 46 is depressed to clear the appropriate memories in microprocessor 42. An appropriate step switch, not shown, on selector switch panel 46 which indexes the numeric display on display 47 is depressed until the numeral 1 appears on display 47. The first assigned carrier frequency is selected on the channel selection switches located on control head 23. An appropriate channel load switch, not shown, on selector switch panel 46 is depressed thereby loading filter select data through multiplexer 43 and channel frequency data through multiplexer 44 together with the binary code for "1" from bus 48 into microprocessor 42. The next assigned carrier frequency is thereafter dialed into radio control head 23, the step switch on switch panel 46 is depressed, incrementing the channel display number to two, and the load/step sequence is repeated until the data for all assigned carrier frequencies has been loaded into microprocessor 42 together with assigned binary codes which identify the channels. When the last carrier frequency has been loaded, the selector illustrated in FIG. 3 is ready for operation in either the XMIT or RCV mode. In the XMIT mode the selector illustrated in FIG. 3 takes control of radio 35. The operator waits until the channel selection is made before attempting to communicate. When the mode switch on switch panel 46 is set to XMIT the selector interface control 45 initiates an appropriate XMIT program stored in microprocessor 42, switches multiplexer 43 and multiplexer 44 so that data on signal busses 24 and 17 will originate at microprocessor 42, and switches the display panel control to accept channel number data from microprocessor 42 on display data bus 48. Microprocessor 42 then tunes radio 35 to the first assigned carrier frequency through busses 24 and 17, causes Δf circuit 55 to output of Δf pulse, and keys radio 35 through key circuit 50. When radio 35 is first keyed it causes antenna tuner 16 to tune to the assigned frequency. While antenna tuner 16 is tuning, the audio tone generated in response to the TIP signal is fed to microprocessor 42 through TIP decoder 53 which causes microprocessor 42 to idle while the tune is in progress.

If antenna tuner 16 is unable to tune to a channel frequency the beeping tone following the TIP signal, audible to the operator through the handheld microphone, has no effect upon the XMIT mode. The second radio simply will not receive the test signal on the untuned channel, continuing unaffected in the RCV mode.

The first radio, at the end of the test signal transmission period will proceed with the XMIT mode.

When the TIP signal stops and the channel is successfully tuned, microprocessor 42 provides a test signal through test tone generator 54 to radio 35 for transmission at the selected frequency. This test signal is transmitted for a period based upon the number of candidate carrier frequencies loaded into the selector. After test signal transmission, microprocessor 42 causes radio 35 to be unkeyed and sequentially tuned for 0.65 seconds to each of the candidate carrier frequencies. Following the reception sequence, the next assigned channel frequency is fed to radio 35 through busses 24 and 17 from microprocessor 42 and the above described sequence is repeated for each of the candidate frequencies. During the receive sequence of the XMIT mode, an answer tone package from the second radio will eventually be recognized on one of the candidate frequencies by microprocessor 42 through receive signal evaluator 52. When an answer signal is recognized microprocessor 42 stops the selector with radio 35 tuned to the selected frequency. At any time during the transmit mode the reset button on switch panel 46 may be pressed which will cause microprocessor 42 to begin the XMIT mode again.

In the RCV mode microprocessor 42 provides filter and channel select data on paths 24 and 17 to radio 35 for periods of 0.65 seconds at each carrier frequency channel and simultaneously feeds the corresponding channel number to display panel 47 by way of display data bus 48. The selector cycles radio 35 continually through the channel frequencies. When radio 35 is tuned to a frequency on which a test signal is being transmitted, signal evaluator 52 recognizes the test signal, assigns a value to its quality according to a method described hereinbelow, and passes the data to microprocessor 42. Microprocessor 42 acknowledges the recognition, determines if the assigned value is the highest observed, and, based on this evaluation, keeps track of the highest quality received frequency channel for use when a cycle recognition occurs.

Cycle recognition occurs when any frequency channel has been recognized twice. Upon cycle recognition microprocessor 42 activates Δf circuit 55, feeds filter and channel select data of the best received frequency channel to radio 35 through multiplexers 43 and 44, displays the channel number of the selected channel on display 47, keys radio 35 for transmission, and feeds the answer tone to radio 35 for 18 seconds of transmission. After transmission of the answer tone signal, microprocessor 42 stops selector operation with radio 35 tuned to the selected frequency.

If antenna tuner 16 cannot tune the frequency for transmission of the answer signal the beeping tone is heard, the operator switches to LOAD and presses an appropriate reject switch, not shown, on panel 46. An appropriate flag is entered in microprocessor 42 causing it to skip the rejected channel in further RCV operations, and RCV is reselected and resumed when the reset switch in panel 46 is depressed.

If the reset switch on switch panel 46 is depressed at any other time in the RCV mode, microprocessor 42 clears its memory of all recognition and value data and restarts reception at channel 1.

Figure 4A:
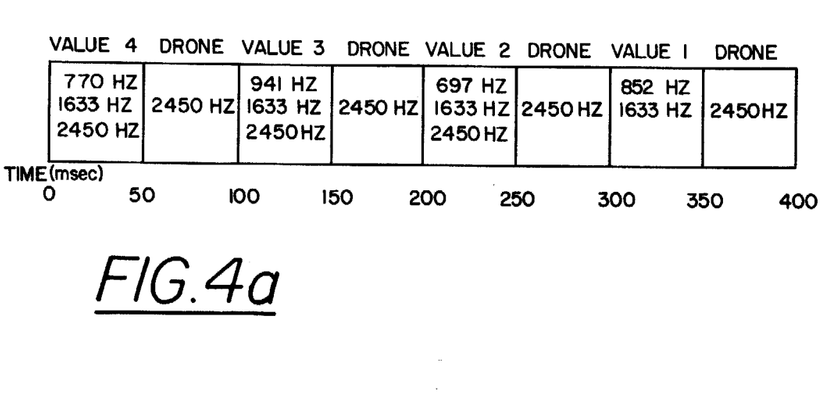
FIG. 4a is a timing diagram of the test signal utilized in the method of the invention.
Figure 4B:
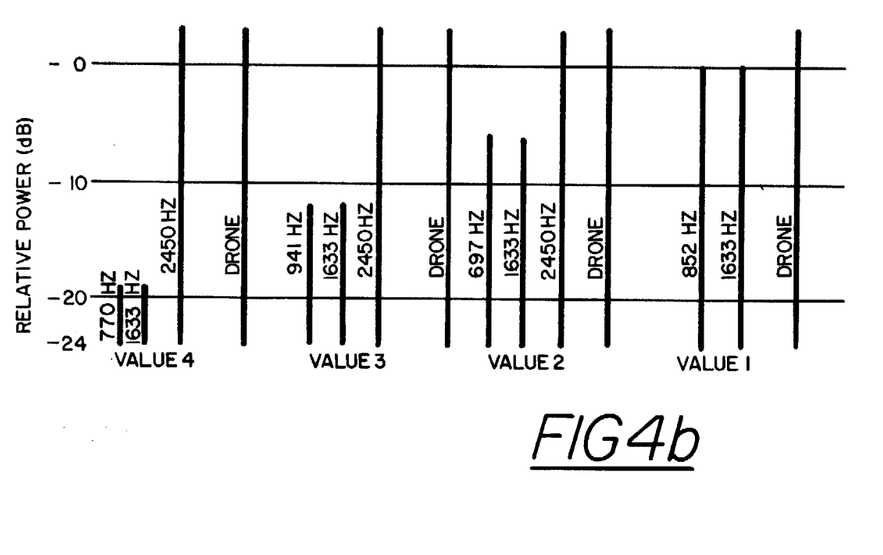
FIG. 4b is a plot of signal spectra of the test signal utilized in the method of the invention.
Figure 4C:
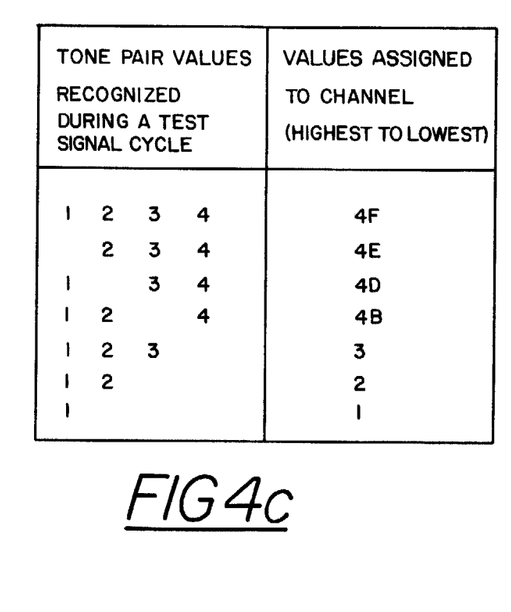
FIG. 4c is a table of test signal evaluation assignments.

Channel quality evaluation is accomplished through detection of a test signal comprising four tone pairs transmitted with power levels which vary over an 18 db range. Each tone pair is assigned a value. In order to keep the total power of the test signal constant, a single drone tone at 2450 Hz is included in the package and its power level is varied to compensate for the level variations of the tone pairs. FIG. 4a shows the composition of the test signal tone package as it progresses through an entire value sequence. FIG. 4b shows the spectra of the tone pairs over the range of values which microprocessor 42 may be programmed to assign upon recognition of the respective tone pair. Thus the tone pair comprising the 770 Hz and 1633 Hz tones with the lowest total power is assigned the highest value of four, and so on down through the value of one for the 852 Hz/1633 Hz pair. The final value assigned to a frequency channel is determined by an appropriate routine in microprocessor 42 at the end of the 0.65 second period during which radio 35 is tuned to a carrier frequency. This valid value is derived as shown in FIG. 4c and is stored by microprocessor 42 together with the channel identification until either a higher value is derived or the test signal is recognized on a carrier frequency for a second time. When a second recognition of a carrier frequency occurs, the identification of the carrier frequency having the highest signal-to-noise ratio is retrieved by microprocessor 42 and an answer signal comprising the 852 Hz/1633 tone pair is broadcast on that frequency.

Figure 3A:
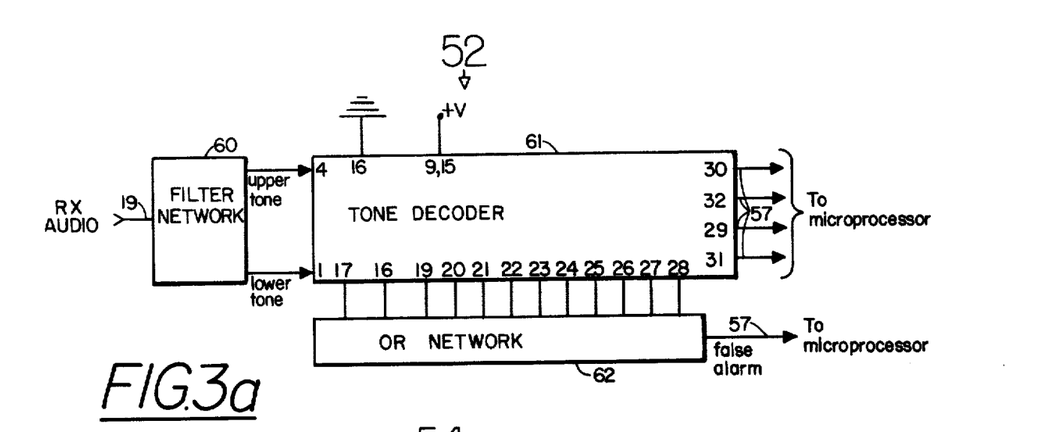
FIGS. 3a and 3b are schematic diagrams of elements contained in the preferred embodiment of the invention.

Receive signal evaluator 52 shown in FIG. 3A, has the capability to recognize a total of 16 tone pairs. During the RCV mode it is possible to detect not only the four acceptable tone pairs but also 12 other unacceptable tone pairs, thus providing a false alarm capability. Filter network 60, which can be Cermatek part nos. 1296 and 1297, is designed to strip off the drone tone while passing the upper and lower tone frequencies to tone decoder 61. The tones are decoded in decoder 61, which may be a Telaris 7516-1 touch tone decoder, and the values assigned with acceptable values appearing on pins 1 through 4, and unacceptable values on gates 5 through 16 being fed to diode OR network 62 where a false alarm signal is developed.

The ability of signal evaluator 52 to recognize a given tone pair depends primarily upon the signal-to-noise ratio at the input of tone decoder 61, directly related to the channel signal-to-noise ratio. Acceptable tone pairs are transmitted at preset levels which range over 18 db as shown in FIG. 4B. The tone pair with the least power can be recognized by tone decoder 61 only if the noise is sufficiently below the level of these tones at its input. Therefore, a frequency channel on which the least power pair is recognized is likely to have the better signal-to-noise ratio than the frequency channel on which only the 852 Hz and 1633 Hz pair is recognized.

Due to AGC and TGC performance characteristics of radio 35, the total power in the test signal is kept nearly constant by putting more power into the drone tone (see FIG. 4B) as the power in the tone pairs is reduced. Presence of the drone tone does not degrade the performance of signal evaluator 52.

Figure 3B:
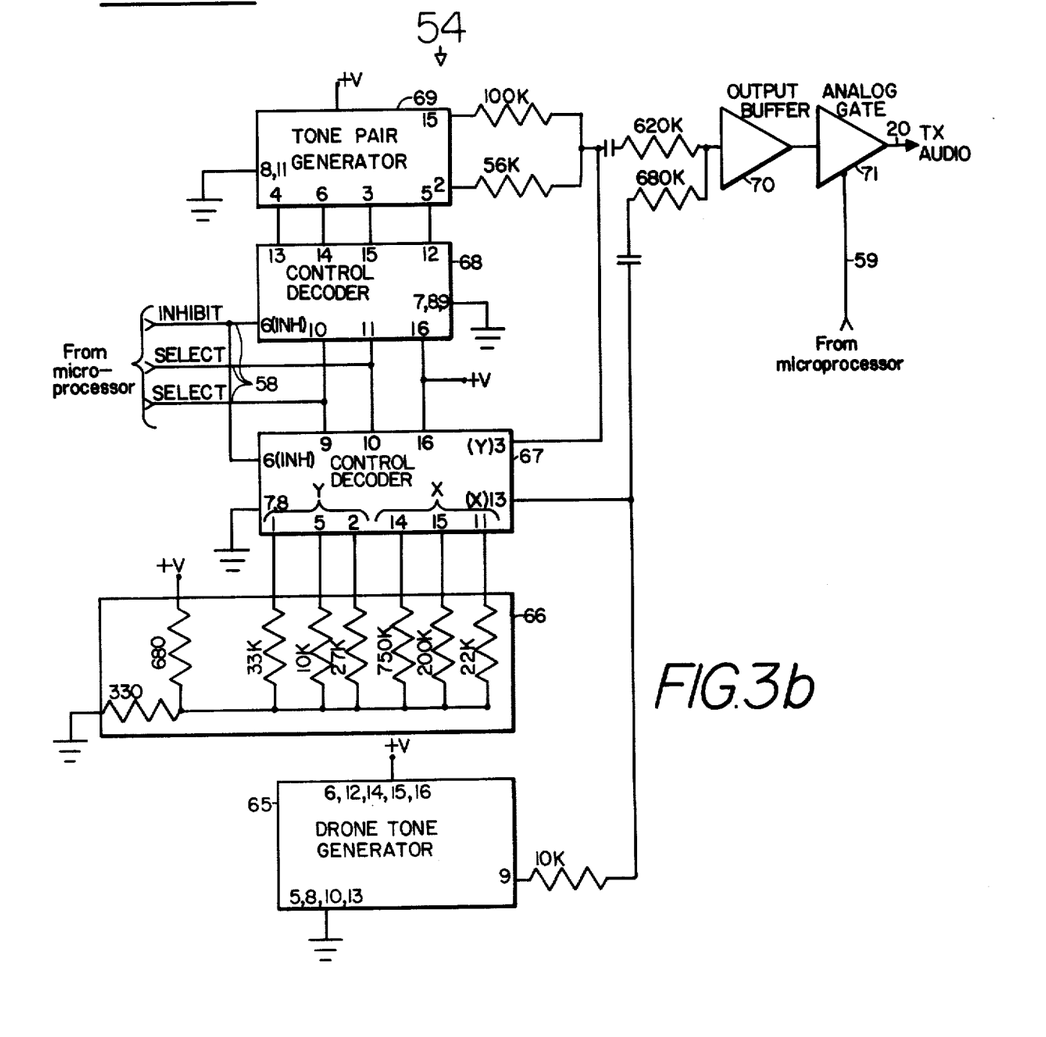

Tone pairs are generated by test tone generator 54 shown in FIG. 3B. Microprocessor 42 controls tone generation through control decoder 68, which can be an RCA analog multiplexer 4051 or equivalent, configured as a two-line to four-line decoder. Decoder 68 provides control signals to tone pair generator 69, which can comprise Motorola device MC14410 or equivalent. Tone generator 69 is configured to continually generate the 1633 Hz tone whenever an additional tone is enabled by control decoder 68. If an additional tone is not enabled, as when decoder 68 is inhibited during a drone tone period for example, generator 69 will not produce the 1633 Hz tone. Drone tone generator 65, which can be Motorola device MC14410 or equivalent, is configured to provide a continual drone tone at 2450 Hz.

Decoder 67, which can be an RCA analog decoder 4052 or equivalent, is connected to allow microprocessor 42 to reconfigure resistor array 66 in such a manner that the signal power levels of the tone pairs generated by pair generator 69 and the drone generator 65 can be shaped to produce the characteristics illustrated in FIG. 4B. Drone tone generation is maximized during the drone tone period when both decoders are inhibited. Inhibiting decoder 68 suppresses the tone pairs. Inhibiting decoder 69 removes resistor array 66 from the output of generator 65 thus preventing it from dividing drone tone power. Output buffer 70 can comprise an appropriately designed operational amplifier; it provides impedance matching to transmit audio line 20. Analog gate 71, which can comprise Microsystems part 7510, is controlled by the same control line 59 from microprocessor 42 used to activate key circuit 50.

Microprocessor 42, in the preferred embodiment comprises RCA part CDP 1802, which, with reference to a manual published by RCA entitled "User Manual for the CDP1802 COSMAC Microprocessor", 1976, can be appropriately programmed to control and carry out a sequence of steps necessary to accomplish the method of the invention. General flow diagrams suitable for designing a control program for microprocessor 42 are illustrated in FIGS. 5a and 5b.

Figure 5A:
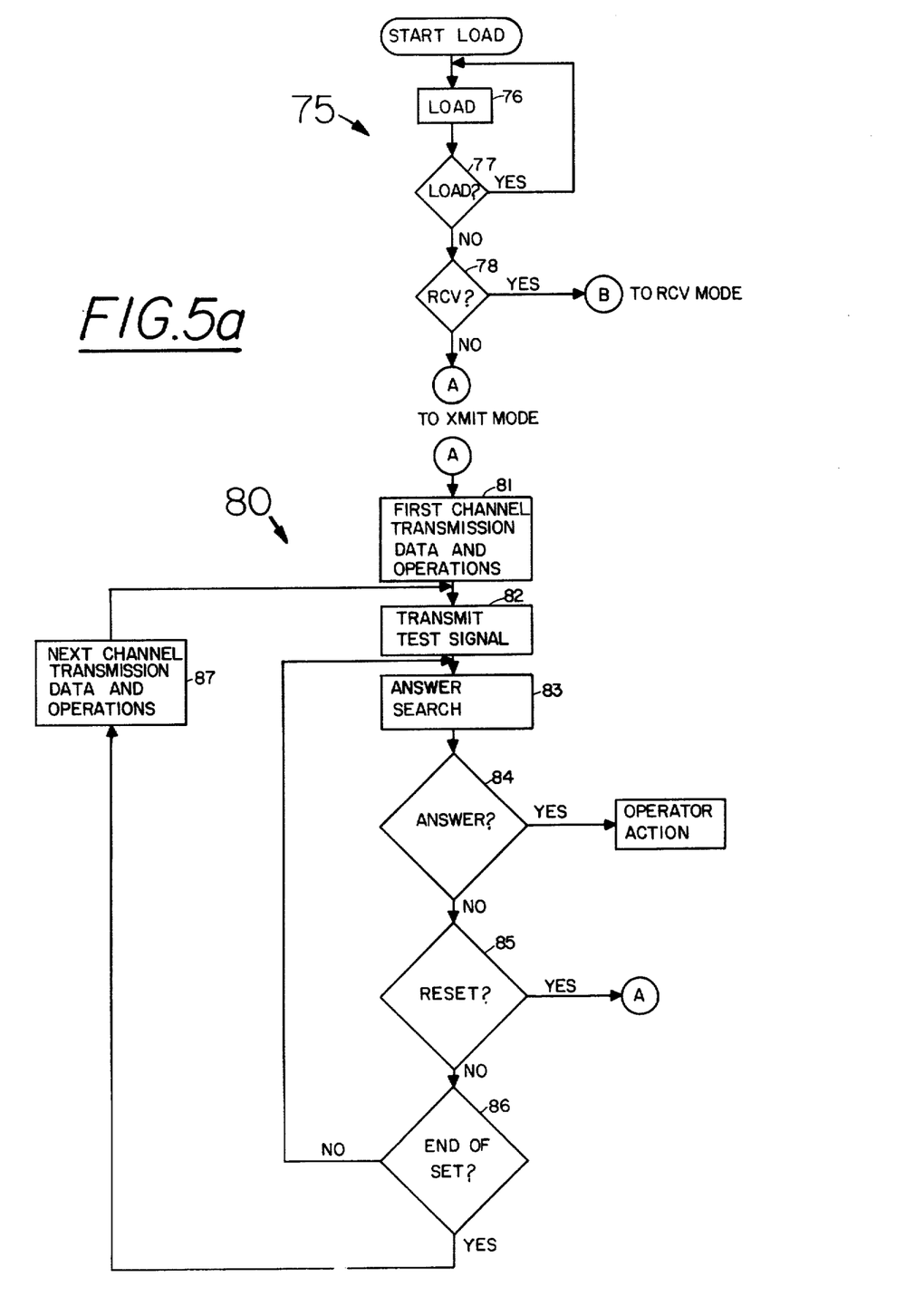
FIGS. 5a and 5b are flow diagrams of a microprocessor program used to implement the method of the invention.
Figure 5B:
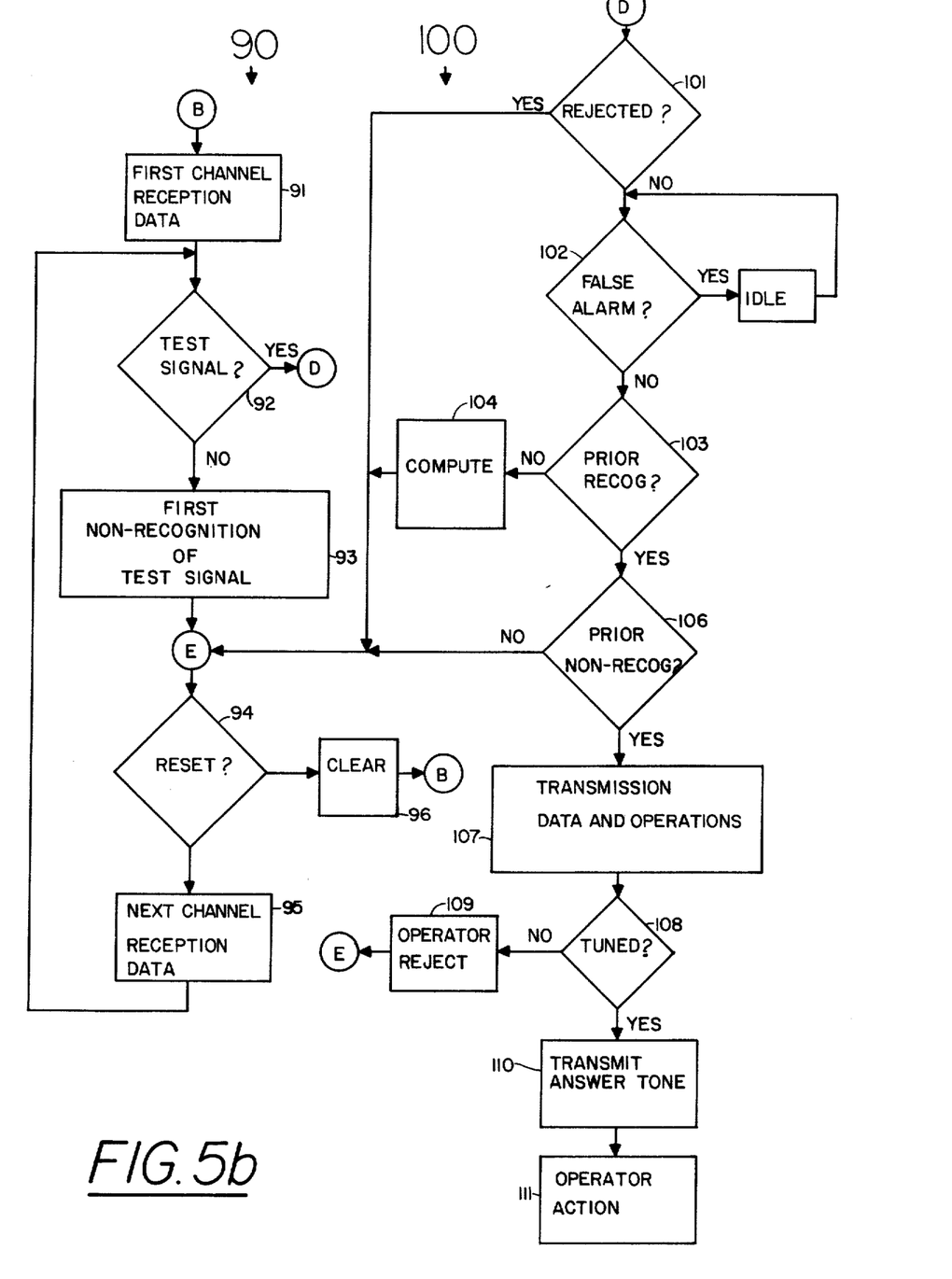

In FIG. 5a, subroutine 75 comprises the LOAD mode operations performed by microprocessor 42. In the LOAD step 76, a channel identification code is taken from bus 48 and stored together with frequency data from bus 17 and filter data from bus 24. The mode switch on panel 46 is sampled in the LOAD decision step 77. If the switch remains in the LOAD position, step 76 is repeated for the next set of channel data. If the reset switch on panel 76 is depressed during the LOAD mode microprocessor 42 will empty its memory of all channel data.

If the result of step 77 is negative, the mode switch is sampled in decision step 78 to determine which of the remaining two modes have been selected.

In the XMIT mode, shown in subroutine 80 of FIG. 5a, step 81 is executed first causing frequency and filter data associated with, for example, channel 1 to be retrieved from memory and placed on the appropriate signal busses. The Δf circuit 55 is pulsed and the expiration of the TIP signal is awaited. In step 82 key circuit 50 is activated, test tone generator 54 is enabled, the test signal is transmitted on the selected frequency, and the channel identification is placed in bus 48 to be displayed on panel 47. The length of the test signal transmission can be varied by an appropriate timing subroutine included in step 82. At the end of test signal transmission, an answer search subroutine comprising steps 83, 84, 85, and 86 will cause radio 35 to be unkeyed and tuned successively to each in the set of selected frequency channels. When the end of the answer search is reached in decision step 86, the next channel in the set is tuned, step 87, and the next channel selected for test signal transmission. When the answer signal is recognized, the channel identification remains displayed on panel 47 and microprocessor 42 idles leaving radio 35 tuned for operation to the channel on which the answer signal was received.

In FIG. 5b, subroutine 90 comprises the RCV mode operations. Step 91 causes radio 35 to be tuned to the first non-rejected frequency in the set; filter and frequency data are put out and the channel identification is displayed. An appropriate timing subroutine can be nested in step 91 to control the time spent tuned to any channel. If no test signal is received, decision step 92 is exited for step 93 wherein microprocessor 42 notes the non-recognition. The reset function, described hereinabove, is performed in decision step 94 and step 96. If the reset switch has not been depressed, the next channel is tuned in step 95, its identification displayed and the answer signal searched for in step 92. This process is repeated until a test signal is detected when step 92 is exited and subroutine 100 entered.

Subroutine 100, also illustrated in FIG. 5b, first tests the accumulated data for the channel on which the test signal is detected for a reject indication. If the channel has been rejected, decision step 101 is exited and subroutine 90 entered at point E. If no rejection has occurred, the false alarm decision block 102 is entered, causing microprocessor 42 to idle if a false alarm is indicated by receive signal evaluator 52. If no false alarm occurs, the accumulated data for the channel is investigated in step 103 to determine whether a prior recognition of a test signal has occurred in the channel. If not, the signal-to-noise ratio is computed by microprocessor 42 according to the method of the invention utilizing the outputs of evaluator 52. Microprocessor 42 also places a recognition indication at an appropriate location in memory where information regarding the respective channel is stored. Microprocessor 42 also compares the computed value against a computed value residing in an appropriate memory location to keep a record of the highest computed value. The higher value together with the identification of the channel on which it was calculated is kept.

If a prior recognition has occurred, step 106 is executed to determine whether a non-recognition has intervened. This is necessary to prevent a termination of the RCV mode within a single test signal transmission. If a prior non-recognition has occurred, radio 35 is tuned in step 107 to transmit the answer signal. If radio 35 cannot be tuned, the beeping tone alerts the operator to perform the reject operation described above—steps 108 and 109. After a reject operation, subroutine 90 is entered at point E.

If radio 35 can be tuned, it is keyed, the answer tone is transmitted, the channel identification is displayed and microprocessor 42 idles leaving radio 35 tuned for operation to the channel on which the answer signal was transmitted. These operations are performed in steps 110 and 111.

The foregoing description taken together with the appending claims constitutes a disclosure of a specific embodiment of the subject invention such as to enable one reasonably skilled in the electronics and radio engineering arts, and having the benefit of the teachings contained herein, to make and use the invention.

Obviously, many modifications and variations of the present invention are possible in light of the above teachings, and, it is therefore understood that, within the scope of the disclosed inventive concept, the invention may be practiced otherwise than as specifically described.

What is claimed is:

1. An improved method for selecting an optimum radio carrier frequency channel, of the type wherein a test signal is transmitted from a first radio for a period of time on each of a set of carrier frequency channels taken sequentially at one rate and a second radio is tuned to each in the set of carrier frequency channels taken sequentially at a higher rate to search for the test signal, the improvement comprising the steps of:

at the end of test signal transmission on a set of carrier frequency channels, switching the first radio to a receiving mode;

tuning the first radio at the higher rate to each carrier frequency channel in the set while in the receiving mode to search for an answer signal from the second radio;

at the second radio, evaluating with the aid of the test signal the signal-to-noise ratio at each carrier frequency channel on which the test signal is received;

and at the second radio, after a second separate reception of the test signal on a carrier frequency, tuning the second radio to the carrier frequency channel on which the highest signal-to-noise ratio was detected for transmitting an answer signal thereon;

whereby all available carrier frequency channels are asynchronously evaluated and the channel having the highest transmission quality is selected.

2. The method of claim 1 wherein the test signal comprises a continuously cycling signal modulated on a carrier frequency, each cycle comprising a plurality of evaluation time periods wherein the test signal assumes the form of a plurality of simultaneous evaluation tones, the total signal power of the tones increasing from the first period to the last period, and the total time of the cycle not exceeding the time spent by the second radio tuned to any carrier frequency for receiving the test signal.

3. The method of claim 2 wherein the test signal includes an equalization tone transmitted simultaneously with the evaluation tones, the signal power of the equalization tone being of such magnitude in any period of the test signal cycle to equalize the magnitude of the combined signal power of all tones for all periods of the test signal cycle.

4. The method of claim 3 wherein the test signal cycle further comprises a non-evaluation time period following each evaluation time period wherein only the equalization tone occurs.

5. The method of claim 4 wherein the second radio is adapted to select the carrier frequency having the highest signal-to-noise ratio according to a method comprising the steps of:

assigning a predetermined weight to detection of evaluation tones occurring during a respective period of the test signal cycle;

combining the predetermined weights assigned during a test signal cycle into a total value assigned to the carrier frequency on which the cycle was detected;

assigning no value to any carrier frequency upon which no evaluation tones are detected; and     when the first carrier frequency to which a value has been assigned is assigned a second value, transmitting an answer tone on the frequency to which the highest value has been assigned.

6. The method of claim 5 wherein the answer signal comprises the evaluation tones having the highest level of transmitted power.

7. An improved radio communication system of the type wherein a first radio has a transmission section, a receiving section and a tuning section for tuning sequentially at a relatively slow rate to each in a set of carrier frequencies for transmission of a test signal and a second radio has a transmission section, a receiving section and a tuning section for tuning sequentially at a relatively higher rate to each in the set of frequencies for detecting the test signal, the improvement comprising:

first control means coupled to switch and control the operation of the first radio;

first tuning means coupled to the first control means and to the tuning section of the first radio and responsive to the control means for tuning the first radio at a variable rate;

means coupled to the first control means and to the transmission section of the first radio and responsive to the first control means for generating a continuously cycling test signal to be transmitted by the first radio on a carrier frequency, each cycle comprising a plurality of time periods wherein the test signal assumes the form of a plurality of tones, the total time of the cycle not exceeding the time spent by the second radio tuned to any carrier frequency for receiving the test signal;

means coupled to the first control means and to the receiving section of the first radio for detecting an answer signal transmitted by the second radio;

second means coupled to switch and control the operation of the second radio;

second tuning means coupled to the second control means and to the tuning section of the second radio and responsive to the second control means for tuning the second radio at a variable rate;

means coupled to the second control means and to the receiving section of the second radio for detecting the test signal and for evaluating, with the aid of the test signal, the signal-to-noise ratio of each carrier frequency on which the test signal is detected and for indicating to the second control means the value of the signal-to-noise ratio; and     means coupled to the second control means and to the transmission section of the second radio and responsive to the second control means for generating an answer signal to be transmitted on the carrier frequency having the highest signal-to-noise ratio.

8. The system of claim 7 wherein the second control means prevents answer signal transmission until after the test signal has been detected during successive separate transmission of the same carrier frequency.

9. The system of claim 8 wherein the test signal generating means includes:

means for generating a plurality of tones;

means coupled to the first control means and to the tone pair generating means and responsive to the first control means for enabling the tone pair generating means to generate particular tone pairs;

means for generating a single tone;

weighting means coupled to the outputs of the tone pair generating means and the single tone generating means for simultaneously varying the power levels of all tones; and     means coupled to the first control means and to the weighting means and responsive to the first control means for enabling the weighting means to produce particular combinations of the power levels.

10. The system of claim 9 wherein the evaluating means includes:
means for detecting the occurrence of tone pairs and for assigning predetermined weights to detection of particular tone pairs during a respective period of the test signal.

11. The system of claim 10 wherein the second control means includes program means for selecting the carrier channel having the highest signal-to-noise ratio.

12. A radio communication system comprising:
a first radio comprising a tuning section for tuning to each of a set of carrier frequencies taken at one rate for transmitting a test signal, and further for tuning, after each test signal transmission on a carrier frequency, to each frequency in the set taken at a higher rate for detecting an answer signal;
a second radio comprising a tuning section for tuning at the higher rate to each carrier frequency in the set for receiving the test signal, and for transmitting the answer signal after the test signal has been detected on separate transmissions of the same carrier frequency;
and
at least two channel selection means, one selection means connected to each radio to control the operations thereof, each channel selection means including:
means for automatically controlling the operation of the radio and for automatically controlling the production of signals, the control means coupled to switch the radio between transmission and reception;
signal generating means coupled to the radio transmission section and to the control means and responsive to the control means for generating a signal comprising a plurality of tones;
signal detecting means coupled to the radio reception section and to the control means for detecting a signal comprising a plurality of tones and for evaluating, with the aid of the signal the transmission quality of a carrier frequency on which the signal was detected; and
tuning means coupled to the radio tuning section and to the control means and responsive to the control means for tuning the radio at varying rates.

13. The system of claim 12 wherein the control means comprises a programmed microprocessor.

14. The system of claim 12 wherein the generating means comprises:
means for selectibly generating a plurality of tone pairs;
first decoding means coupled to the control means and to the tone pair generating means and responsive to the control means for causing the generating means to produce a particular tone pair selected by the controlling means;
means for generating a single tone;
weighting means coupled to the outputs of the tone pair generating means and the single tone generating means for simultaneously varying the power levels of all tones; and
second decoding means coupled to the control means and to the weighting means and responsive to the control means for causing the weighting means to produce a particular combination of tone power levels selected by the control means.

15. The system of claim 12 wherein the signal detecting means comprises:
means for detecting the occurrence of tone pairs and for assigning predetermined weights to detection of particular tone pairs.

* * * * *